No. 855,738. PATENTED JUNE 4, 1907.
S. P. WILBUR.
ELECTRODE FOR ARC LAMPS.
APPLICATION FILED DEC. 6, 1902.
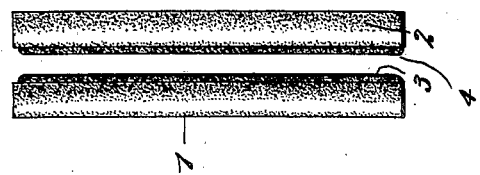
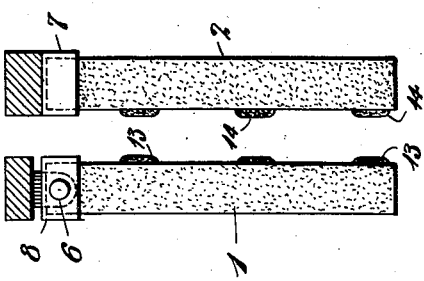
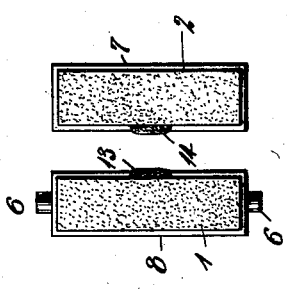
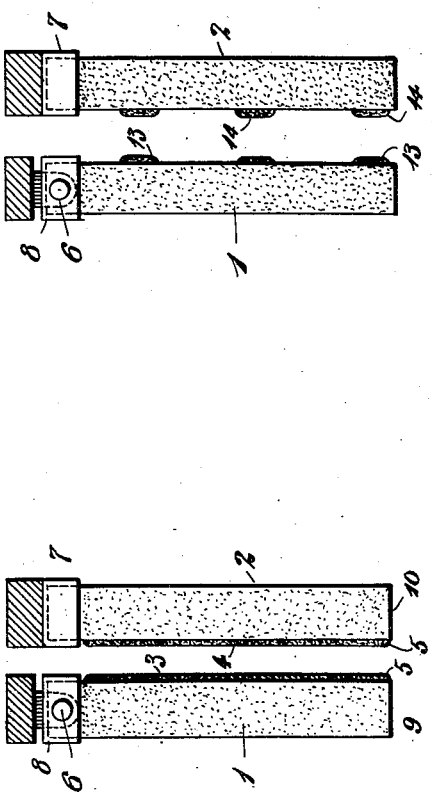
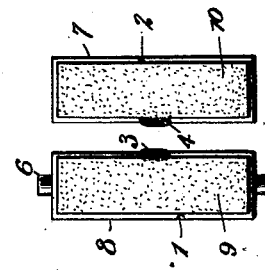

UNITED STATES PATENT OFFICE.

SAMUEL P. WILBUR, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRODE FOR ARC-LAMPS.

No. 855,738.   Specification of Letters Patent.   Patented June 4, 1907.

Application filed December 6, 1902. Serial No. 134,081.

*To all whom it may concern:*

Be it known that I, SAMUEL P. WILBUR, a citizen of the United States, and a resident of Wilkinsburg, in the county of Allegheny and State of Pennsylvania, have invented certain new and useful Improvements in Electrodes for Arc-Lamps, of which the following is a specification.

The present invention relates to an improved form of electrode for arc lamps, and is particularly applicable to electrodes in which carbon is mixed with a percentage of metallic salts which form a slag during the operation of the lamp.

The electrodes in lamps of this class are usually arranged side by side, and either parallel with each other or converging toward each other in a downward direction. The arc may be established by swinging or turning one of the electrodes into contact with the other, and then separating them and maintaining them at a certain distance from each other.

The slag formed during the operation of the lamp is maintained in a state of fusion in close proximity to the arc itself, but rapidly cools and hardens into an electrically non-conductive substance, when the arc is removed. Since the arc, in the lamps referred to, travels along the lower ends of the electrodes, it is evident that, after repeated use, these ends will carry along their edges, projections or globules of the described non-conductive slag. These projections interfere with the electrical contact of the electrodes when the latter are swung together.

It is the object of the present invention to provide means by which electrodes of this type may be electrically started with certainty, and an arc established which will not rupture, but act to fuse the slag, and place the electrodes in normal operating condition. The means by which I accomplish this result may be described as follows:

I may apply to each electrode, by molding or otherwise, along its vertical center line, a ridge, or a series of projections, consisting of some material suited to the establishment of a stable arc without the formation of slag, or other electrically non-conductive substance. For this purpose I have found that carbon, in a comparatively soft state, yields the best results. The ridge, or the series of projections, are so arranged as at all times to over reach the slag formation on the electrode proper; and therefore when the electrodes are swung together, the said ridges or projections come into contact first, forming good electrical connection and permitting the establishment of the arc in a reliable manner. On separation, the arc travels from the projections to its normal position along the lower ends of the electrodes.

Broadly considered, the invention consists in adding to electrodes which form a slag during the operation of the lamp, a starting projection or projection designed to form electrical contact and to establish a stable arc on separation. I usually add these projections to the finished electrode, and mold and bake them in place; but any other suitable means may be employed for making the connection between the main body of the electrode and the projections.

I have illustrated my invention in the accompanying drawings in which

Figure 1 is an elevation and Fig. 2 a plan of flat or plate electrodes provided with ridges; Figs. 3 and 4 are similar views of such electrodes provided with a series of bosses or projections; and Figs. 5 and 6 are similar views of pencil electrodes having my invention applied thereto.

In the drawings, 1 is the swinging electrode, adapted to turn about a pivot 6 in the holder 8, in such a manner that its lower edge comes into contact with the corresponding edge of the fixed electrode 2, set in the holder 7. Ridges or projections, 3 and 4, are placed upon the electrodes 1 and 2 so that, on the approach of the said electrodes the lower edges 5, 5, of these ridges come into contact and establish electrical connection. On separation, the arc travels from the said ridges down to its normal position across the lower ends 9 and 10 of the electrodes 1 and 2, being drawn and held to this position, ordinarily by the action of a magnetic field which is usually employed in connection with this type of lamp.

In Figs. 3 and 4, the ridges of Figs. 1 and 2 are replaced by bosses, 13 and 14, as shown.

In Figs. 5 and 6 the ridges 3 and 4 are applied to electrodes in pencil form, the action being the same.

I claim as my invention.

1. An arc lamp electrode composed of carbon mixed with materials which form a slag during the operation of the lamp, in combination with a conducting projection forming an integral part of the said electrode and composed of material free from such slag-producing materials.

2. In an arc lamp, a pair of electrodes, one of which is adapted to make contact with the other for starting, and both electrodes being composed of carbon mixed with a substance adapted to produce a slag during the operation of the lamp, in combination with projections of conducting material free from such slag producing substances, the said projections being in line with each other on adjacent faces of the electrodes.

3. An arc lamp electrode composed of carbon mixed with materials which form a slag during the operation of the lamp, in combination with a conducting projection of carbon, the said projection forming an integral part of the said electrode.

4. In an arc lamp, a pair of electrodes, one of which is adapted to make contact with the other, and both electrodes being composed of carbon mixed with a substance adapted to produce a slag during the operation of the lamp, in combination with projections of carbon, the said projections being in line with each other on adjacent faces of the electrodes.

5. In an arc lamp, a pair of electrodes designed to be started by contact, the said electrodes being composed of carbon mixed with a substance adapted to produce a slag during the operation of the lamp, provided with conducting projections adapted to form a means of contact, the said projections being free from slag producing substances.

Signed at East Pittsburg, in the county of Allegheny, and State of Pennsylvania, this 28th day of November A. D. 1902.

SAMUEL P. WILBUR.

Witnesses:
JAMES B. YOUNG,
WESLEY G. CARR.